United States Patent

Ruf et al.

[11] Patent Number: 5,590,479
[45] Date of Patent: Jan. 7, 1997

[54] METHOD FOR CONTINUOUSLY CRYSTALLIZING AND POLYMERIZING SYNTHETIC MATERIAL AND A DEVICE FOR IT

[75] Inventors: Arthur Ruf, Schwerzenbach; Brent A. Culbert, Wil; Eszter Trenka, Niederuzwil, all of Switzerland

[73] Assignee: Bühler AG, Uzwil, Switzerland

[21] Appl. No.: 105,045

[22] Filed: Aug. 11, 1993

[30] Foreign Application Priority Data

Aug. 11, 1992 [CH] Switzerland ............... 02 516/92-0

[51] Int. Cl.⁶ .................................................. F26B 17/00
[52] U.S. Cl. .................... 34/589; 34/580; 34/586; 34/590
[58] Field of Search .......................... 34/580, 586, 589, 34/590

[56] References Cited

U.S. PATENT DOCUMENTS 5,090,134  2/1992  Russemeyer et al. ............... 34/57 R
5,119,570  6/1992  Rüssemeyer et al. .
5,279,046  1/1994  Vincent .................................. 34/35

Primary Examiner—Henry A. Bennett
Assistant Examiner—Siddharth Ohri
Attorney, Agent, or Firm—Martin A. Farber

[57] ABSTRACT

In a procedure for continuously crystallizing and polymerizing polyester and polyamide materials, amorphous material is first precrystallized, preferably in a fluidized bed (1,2), then heated up to the reaction temperature in a preheating zone (4) and finally polymerized and largely liberated from byproducts in a reactor (3). In this procedure, material from the discharge area of the preheating zone (4), of the reactor (3) or of a cooler (8) is subjected to an optical analysis in an analyzing unit whereby the degree of polymerization of the material and/or the contents of byproducts can be determined. The result of the analysis as actual value is compared in an comparator unit with a predetermined nominal value obtained in at least one calibration procedure for forming at least one controlled value serving to form at least one control signal that can be supplied to at least one final control element.

55 Claims, 3 Drawing Sheets

METHOD FOR CONTINUOUSLY CRYSTALLIZING AND POLYMERIZING SYNTHETIC MATERIAL AND A DEVICE FOR IT

FIELD OF THE INVENTION

The invention relates to a method for continuously crystallizing and polymerizing synthetic material, wherein amorphous material is first crystallized whereafter the at least partially crystallized material is heated up to an increased temperature, particularly to 220°–230° C., and subjected to further heat treatment in a reactor, a device for carrying out the method and the use of a spectrometer in such a method.

BACKGROUND OF THE INVENTION

In the known methods for preparing high molecular polyester or polyamide, granulated or pulverized material is crystallized in a first step, with the material being held in a continuous motion in order to prevent the granules from sticking together, which may be done in asymmetric moved mixers, shaft reactors containing stirrers or, as a preferred procedure, in a fluidized bed. The EP-A2-379 684 discloses a particularly advantageous arrangement, in which the material to be treated is made to pass through two fluidized beds arranged in series, the first of which being a whirling fluidized bed having mixing characteristics and the second being a fluidized bed having plug flow characteristics. By using this arrangement, a troublefree crystallization even of a sticky material, by way of example, will be made possible, and there will be obtained a granular material free of any agglomerates and of a uniform degree of crystallization.

After the precrystallizing procedure the material is introduced into a preheating zone, in which the material is heated up to a temperature of 220° C. to 230° C., by way of example, with preferably inert gas flowing through the material. The residence time in the preheating zone amounts to 2 to 4 hours, by way of example.

Following its stay in the preheating zone, the heated material is polymerized in a reactor to the extent of the desired degree, using a further heat treatment in the presence of inert gas. Byproducts, such as aldehyde, carboxylic end groups, etc., are liberated during this final procedure step and carried along with the inert gas. Thereafter, the material is cooled in a cooler in order to make it fit for storage. The typical residence time in the reactor is up to 24 hours.

Depending on the further use of the material, the requirements which the material has to meet will vary. For example, for its use in the foodstuff packing industry it is of importance that the polymer is free of acetaldehyde, which—even in small concentrations—has a specific smell of its own. For other applications, a particularly high mechanical strength or high transparency of the final product may be relevant. These differing requirements call for courses of procedure chosen according to the respective conditions. Thus, high degrees of polymerization can be achieved by using high reaction temperatures and longer reaction times, with, possibly, undesirably large amounts of acetaldehyde being simultaneously formed due to thermic or thermooxidative degradation. In addition, the final product will be discolored yellowish in an unsatisfactory manner in many cases.

In different methods attempts have been made to overcome these problems in all of these cases, which consisted essentially in determining the processing conditions for obtaining the desired product on the basis of serial tests. Thus, the DE-A1-28 34 162 describes such a method in which the contents of acetaldehyde of linear polyethyleneterephthalate is reduced to less than 2.5 ppm. By using this method, the contents of acetaldehyde of samples taken are examined chromatographically, the appertaining, and therefore characteristic, procedure values for temperature and residence time are established on the basis of serial tests, serving as procedure instructions.

A parameter for the degree of polymerization of thermoplastic synthetics is the intrinsic viscosity which conforming to standards is determined by 0.02 to 1.0% solutions, for example in a mixture of phenoltetrachloroethane. The intrinsic viscosity increases with the degree of polymerization. However, this intrinsic viscosity value, which is also called IV, indicates comparable reference values merely for the respective product group, but these values are of great relevance in determining the processing behavior and the application properties to be expected. Thus, determing the IV enables one to establish the degree of polymerization achieved by a certain material. This is an often chosen method in which the temperature and residence time—and, if necessary, other processing conditions as well—are determined in the reactor or the preheating zone according to the IV of the material fed into the reactor or into the preheating zone and are then taken as a basis for the various methods used. Such methods are known, e.g., from the DE-B2-25 59 290, the DE-OS-1 770 410 and also from the above-mentioned DE-A1-28 34 162.

Such methods which are carried out in accordance with the experimental values gained by serial tests, can result in uniform final products only under completely constant conditions. Each deviation, even being small, from the conditions determining the respective procedure instructions, such as temperatures, residence times in the crystallizing part, preheating zone or reactor, amount and nature of the material to be treated, feed conditions between the individual procedure steps, can affect the quality of the final product obtained in an unforeseeable manner, with no possibility existing of any direct influencing during the process itself.

SUMMARY OF THE INVENTION

In contrast to this, it is an object of the invention to provide a method for continuously crystallizing and polymerizing polyester or polyamide materials, in which the disadvantages appertaining to the known methods are overcome so that the final product will safely have the desired properties, with the possiblity existing to readjust respective deviations caused by random conditions, or by the material or device used. This becomes possible by the material from the discharge area of the preheating zone, either of the reactor, or of the cooler, being subjected to an optical analysis in an analyzing unit whereby the degree of polymerization of the material or at least one physical and/or chemical parameter determining the process is established, whereafter the result of the analysis thereby obtained is compared in a comparator unit as an actual value with a predetermined set value obtained in at least one calibration procedure for forming at least one controlled value serving to form at least one control signal that can be supplied to at least one final control element.

By having parameters, such as the degree of polymerization of the material and further physical and/or chemical parameters, such as the contents of byproducts, the coloring of the crystallized and polymerized material, made accessible to an optical checking and examination, which can be made directly on the material at different times and places of the procedure, the values gained can be used to control the process for obtaining products with predetermined properties. Owing to this, in contrast to the known methods, no sample preparations have to be made. Under the term "optical" only the visible area of the electro-magnetic radiation is to be understood. Also radiation of long or short wave lengths is to fall under this term.

Thus, characteristic properties, such as dispersion or double refraction, can be determined for different plastic materials, or for the degree of polymerization of particular synthetics, respectively. The respective appertaining values gained in corresponding calibration procedures serve as reference values, with the degree of polymerization being determined via the determination of the IV in a known manner. If these reference values are determined for different ranges of temperature and/or further physical or chemical parameters, multidimensional models will be given. The actual value for the material in a certain processing condition, or at a certain point of the procedure, respectively, obtained in the respective analysing unit can be compared in a comparator unit with those set values obtained in the individual calibration procedures for forming a controlled value; thus, a control signal can be formed which is applied to a final control element. In general, particularly if importance is attached only to maintenance of a definite property of the material repeatable within certain tolerances, it will be sufficient to limit these calibration procedures to certain value pairs, such as temperature in preheating zone, or reactor and degree of polymerization or contents of aldehydes, carboxylic end groups, etc., or residence time in preheating zone, or reactor and degree of polymerization or contents of aldehydes.

A particularly simple possibility of controlling the procedure and of a concurring ensurance of the quality of the final product is given by the use of a spectrometer as an analyzing device determining the qualitative composition and the parameters of state of the material at particular times and at particular processing conditions. In principle, different spectral apparatus, such as prism, grating or interference spectrometers, can be used for such spectroscopical examinations. A polarization single beam interferometer working in the near infrared area, as it is disclosed in the WO 90/10101, has proven to be particularly user-friendly, since by its use a robust arrangement being largely insensitive to vibrations is made possible and, in additon to that, the tolerances of the optical components will surpass those of a classical Michelson interferometer by orders. The spectroscopical procedure used in this spectrometer results in great luminous intensities and the identification examinations during the procedure can be done in situ and within seconds. In accordance with the above description, also in this arrangement there will be made reference spectrograms of known substances assigned to different parameters of state and/or compositions. The spectrogram made during the procedure is compared with these set spectrograms, there is formed at least one controlled value, and a corresponding control signal is supplied to the corresponding final control element.

For a quick evaluation of the spectrograms the measuring data are advantageously subjected to a chemometrical analysis. In doing this, the establishment of the spectral data by means of Fourier analysis, in particular Fast Fourier analyis, will be advantageous, although other methods can also be used.

If in order to obtain a model being as wide as possible, the set spectrograms and also the actual spectrograms are made for particular wave ranges (for the procedure according to the invention, a range from about 1000 nm to about 2500 nm has proven advantageous), a selection of the wave lengths of the actual and set spectrograms to be compared and thereby a concentration on particular absorption peaks is to be preferred for determing the controlled value. By selecting such a wave length, there will be achieved an improvement of the chemometrical model and thus an increase in quality of the quantitative statements.

As controlled values, the temperature in the preheating zone and/or in the reactor, on the one hand, or else the residence time of the material in the preheating installation and/or in the reactor are suitable variables. The residence time of the material in the preheating zone and/or in the reactor cannot only be influenced via the amount of material to be discharged within a certain period of time but is also determined by the amount of material fed into the preheating zone or into the reactor per time unit. Thus, if necessary, such a control should already include the material throughput from the crystallizing part as well.

Since it is a well-known fact that a control via the temperature is relatively indifferent, the two controlled values of a cascade control can be taken as a basis for improving the control behavior. In such a case, the main control loop will generally be slower than the auxiliary control loop. Disturbance variables are fully stabilized already in the auxiliary control loop, with their effect on the main control loop thereby being reduced. The main control can be regarded as constant value control with a predetermined set value. Therefore, the temperature will be a suitable main controlled value and the residence time will be suited as an auxiliary controlled value.

Since the analyzed material may exhibit very different temperatures according to the particular time of procedure of the analysis made, so that the results gained during the analysis will differ even in the case of equal compositions, or equal parameters of state, respectively, materials of differing temperatures should be taken as a basis for the calibration procedure to be carried out for determining the predetermined set values so that a temperature-dependent correction can be made, if necessary. The temperature of the material to be analyzed ought to be determined, e.g., by means of a temperature sensor. By choosing such a procedure, there will be available reference values that can be definitely assigned according to the state of procedure.

To carry out the method according to the invention, it is suggested for a device comprising a crystallizing part, a preheating zone and a reactor joining it and a charging and discharge element each arranged at the preheating zone or at the reactor, respectively, to provide an optical analyzing unit whose output signal is preferably supplied to an analog digital converter, preferably via an amplifier stage, whose output is connected to the input of a digital processing system comprising a memory and a comparator unit for actual and set values, which are to be assigned to the degree of polymerization of the material or to the generally physical and/or chemical parameters influencing the process, with the output signal of the comparator unit being suppliable as a control signal to at least one control unit. These constructional measures in accordance with the invention make it possible to control the process such that the degree of polymerization or the generally physical and/or chemical parameters of the desired final product influencing the process are so provided that they meet the requirements of quality ensurance. As a more cost-saving variant for the device for carrying out the method, the output signal of the optical analyzing unit can be supplied to a selector switch whose first output is connected to a first processing/memorizing system, and whose second outuput is connected to a second processing/memorizing system, with the first processing/memorizing system being designed for the uptake and memorizing of set values and the second processing/memorizing system being designed for the uptake and memorizing of actual values, with the set and actual values being assignable to the degree of polymerization of the material and/or the contents of byproducts, and with the data outputs of the two processing/memorizing systems being supplied to a comparator whose output signal is suppliable as a control signal to at least one control unit.

As described above, the optical analyzing unit can be a device for measuring the dispersion or the double refraction; however, particularly advantageous is the use of a spectrometer, in particular the above-mentioned polarization single beam interferometer, preferably in connection with the processing system that provides the spectograms, memorizing and comparing them, and which forms the corresponding control signals for the corresponding final control elements.

BRIEF DESCRIPTION OF THE DRAWINGS

Further characteristics of the invention will become apparent from the description of embodiments schematically shown in the drawings, in which FIG. 1 schematically shows a course of procedure for crystallizing and polymerizing polyester or polyamid material.

DETAILED DESCRIPTION OF THE DRAWINGS

Figure 1:
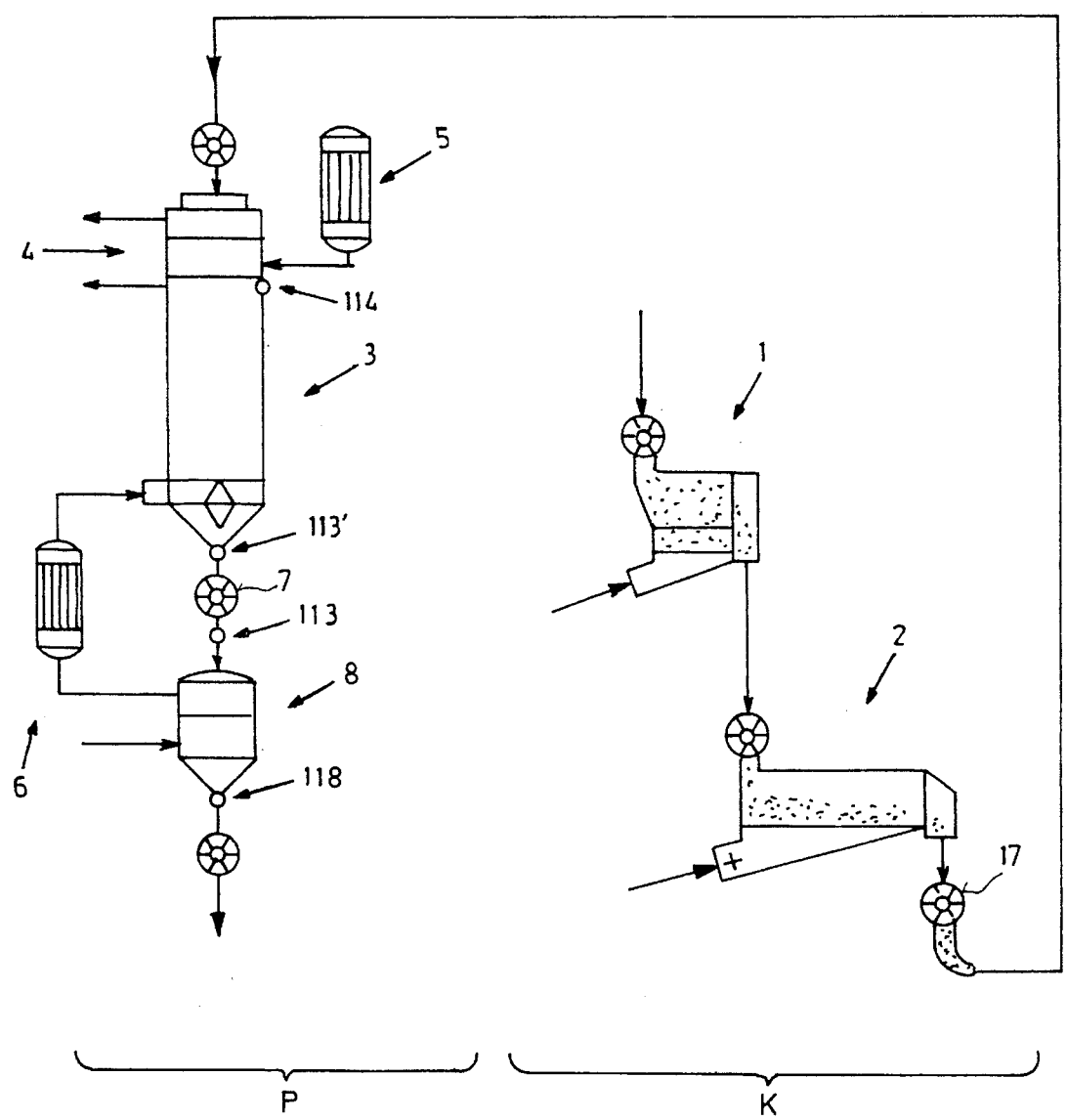

From FIG. 1 there can be seen the two procedure portions which effect the crystallization K and the polymerization P of polyester or polyamide materials. The material is fed as an amorphous raw granulate into a first fluidized bed 1 where it is moved and heated up by some fluidizing gas. As a fluidizing gas there is used air or an inert gas, e.g. nitrogen. The temperature of the granulate is adjusted to, e.g., 160° C., the average residence time depends on the tendency of the material to stick together and may range from 5 to 60 minutes. The granular flow coming out of the fluidized bed 1, which granular flow is already precrystallized, and whose IV may amount to about 0.68, is transferred into a second fluidized bed 2 in which a very slight fluidization takes place, so that the material can move only slowly in the form of a plug flow. Here, the fluidizing gas has been heated up only somewhat higher, i.e. about 10° C., than the fluidizing gas in the first fluidized bed 1. The residual still amorphous granules are crystallized, with a minimum residence time of 2 to 25 minutes being provided.

The material having a largely uniform degree of crystallization is then polymerized in a reactor 3, with the temperature required for this procedure lying above the oxidation temperature of the material. For this reason, this procedure is carried out in the presence of inert gas, e.g. nitrogen. The pre-crystallized material has to be heated up prior to its entry into the reactor 3, which occurs in a so-called preheating zone 4. The drying procedure takes place in this reactor 3. Heated inert gas flows from a first heating device 5 into the preheating zone 4, whereby an increase in temperature up to a temperature of 200° C. to 230° C. is ensured. Besides, the material is subjected to a continuous motion. The residence time in the preheating zone is between 2 and 4 hours. After passing the preheating zone 4, the IV value of the material has increased to 0.80.

The reactor 3 directly joining the preheating zone 4 is adjusted for a residence time up to 24 hours. Inert gas, heated up in a further heating device 6, flows through the material. In this treatment phase, there are formed aromatic byproducts, or a degree of polymerization of the material is achieved, respectively, which corresponds to an IV of about 1.0.

The completely polymerized material is fed into a cooler 8 via a discharge element 7, in which cooler 8 it is cooled.

Figure 2:
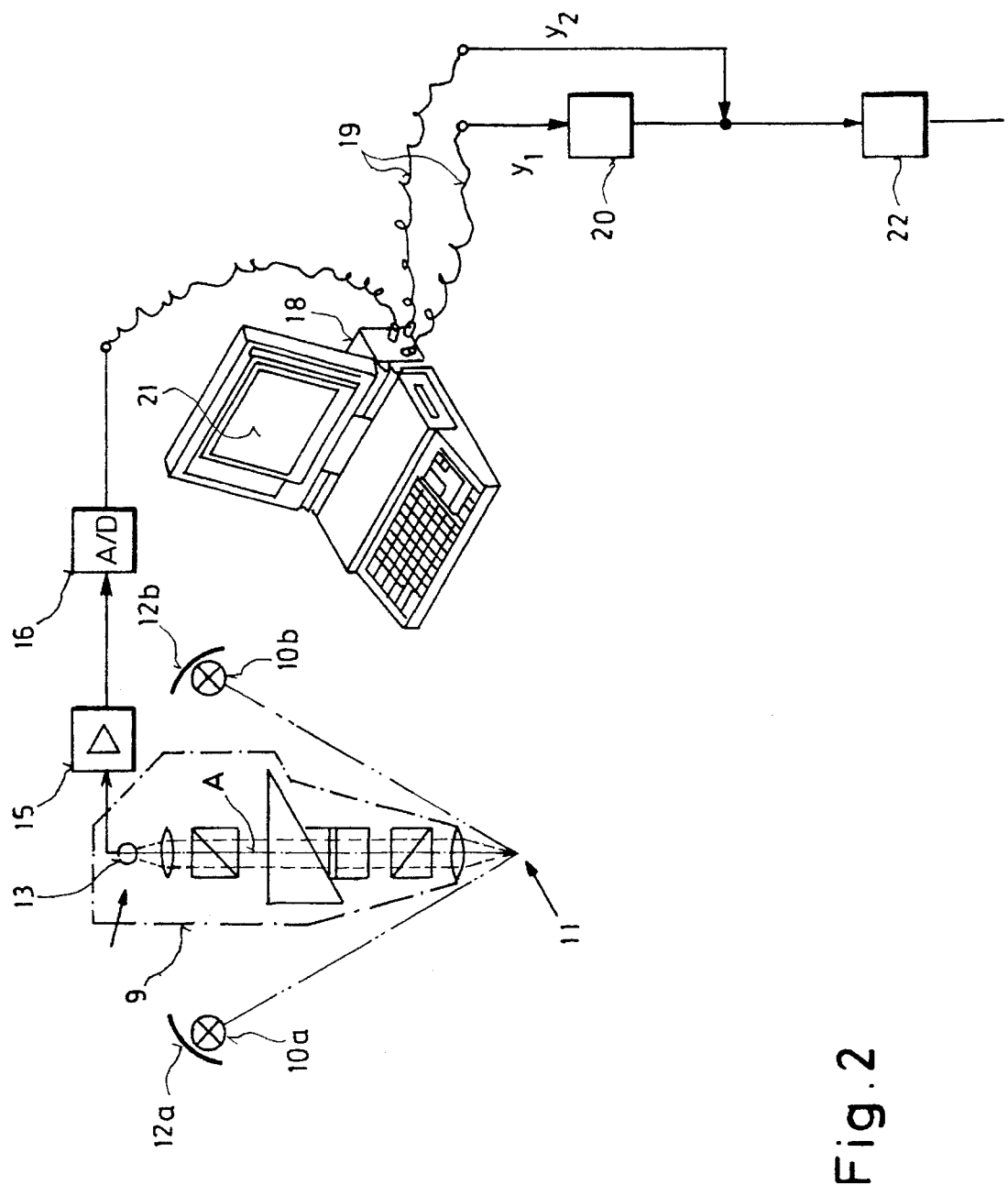
FIG. 2 illustrates an arrangement for determining certain parameters of state of the material and a circuitry for controlling the procedure.

From FIG. 2 there can be seen an arrangement enabling the determination of parameters of state of the material. A spectrometer 9, preferably a polarization single beam interferometer, as described in the WO 90/10 191, is preferably provided for this purpose. A light source 10, if required in the form of illumination units 10a and 10b having reflectors 12a and 12b, arranged symmetrically to the optical axis A of the spectrometer 9, enables a monitoring by means of impinging light. The measuring point 11 of the spectrometer 9 may be assigned to the discharge area of the preheating zone 4 (in FIG. 1 indicated 114), or to the discharge area of the reactor 3 (in FIG. 1 indicated at 113 or 113') or else only to the discharge area of the cooler 8 (in FIG. 1 indicated at 118). Since the measurement may be effected via diffuse reflection by means of fiber optics, a measurement in the various discharge areas is possible, with corresponding locks for introducing the fiber optics, or for a short-time discharge of material being providable, if necessary. The arrangement of the measuring points will be dependent upon via which variables the control is to be effected. For the purpose of a mere temperature control, a measuring point 114 (FIG. 1) assigned to the discharge area of the preheating zone 4 may be sufficient. However, it is conceivable that reference values obtained from different measuring points by means of a plurality of optical analyzing units 9 can be used for controlling the process.

The output signal of a photoelectric transducer 13 of the spectrometer 9, conveniently protected from laterally impinging light by means of a casing 14 represented in dot-dash lines, is amplified in an amplifier stage 15, digitalized in an analog digital converter 16 and then supplied to a processing system 18 which essentially carries out a Fourier analysis and a comparison with already stored spectrograms calibrated to different degrees of polymerization or different contents of byproducts, preferably at different temperatures.

From this comparison controlled values can be determined, particularly the temperature in the preheating zone 4 and/or in the reactor 3 (FIG. 1). If the measuring point 11 is assigned to the discharge area of the preheating zone 4, the temperature will be controlled in the preheating zone 4 via the the first heating device 5; however, if the measuring point is assigned to the discharge area of the reactor 3 or to the one of the cooler 8, the control of temperature can be effected both via the first heating device 5 and via the second heating device 6 in the reactor 3. The residence time of the material in the preheating zone 4 or in the reactor 3 presents itself as the second controlled value. To a certain degree, this control can be effected on the reactor 3 (FIG. 1) via the discharge element 7, but it can also be accomplished via the supply into the preheating zone 4 or the reactor 3. The latter method is given via the discharge element 17 on the crystallizing part, which comprises the two fluidized beds 1 and 2 in the case represented in FIG. 1. Accordingly, it may be necessary to provide an equalizing vessel between the crystallizing part and the preheating zone or the reactor to be able to compensate also for larger fluctuations within the control range for the residence times. Since the temperature control represents a relatively inert and slow control, the temperature or the residence time may be introduced as main controlled or auxiliary controlled values for improving the behavior of the control. The comparison of the actual values, i.e. of the spectrograms, with the stored set value spectrograms can also be displayed and monitored on the screen 21. From the comparison, there are established corresponding correcting variables y1 and y2 which, in the form of control signals, are supplied via lines 19 to the final control element 20, which can be assigned to the heating devices 5 and/or 6, and to the final control element 22 which, in turn, can be assigned to the discharge element 7 at the reactor 3, to the discharge element 17 at the crystallizing part K or also at an equalizing vessel (FIG. 1; equalizing vessel not shown) arranged after the crystallizing part K.

Figure 3:
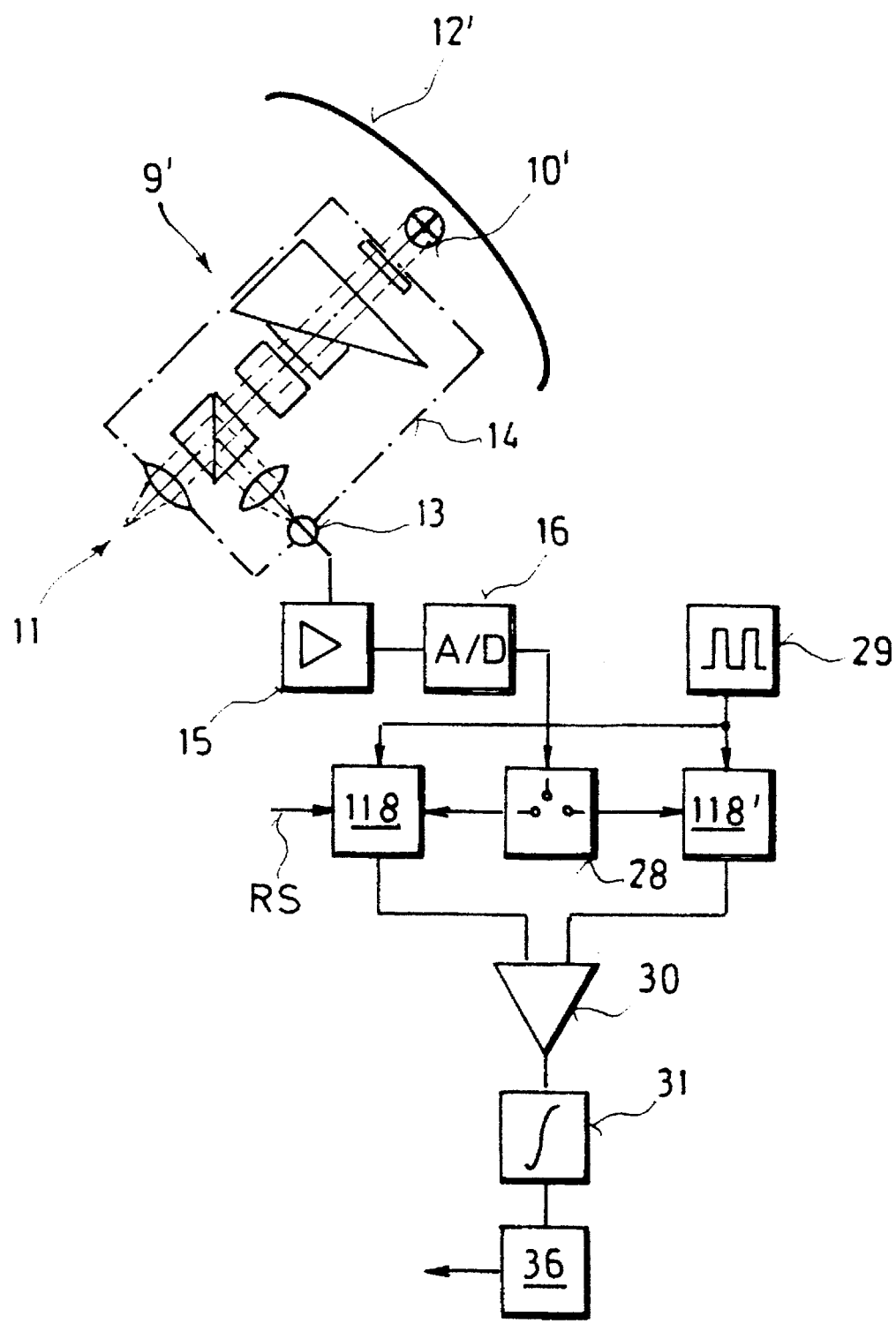
FIG. 3 shows an alternative arrangement to the one according to FIG. 2.

FIG. 3 shows an alternative arrangement wherein the optical analyzing unit, i.e. the spectrometer 9', is drawn in a fore-shortened manner, comprising a single light source 10' having a large reflector 12'. The output signal of the photoelectric transducer 13 is amplified in the amplifier 15, converted in the analog digital converter 16 and selectively supplied via a converter stage 28 to a first processing and memorizing system 118' or to a second processing and memorizing system 118'. Processed and stored luminal set spectrograms which correspond to that discussed above are obtained from calibration procedures. To delete any stored contents, an erase signal can be input via a reset input RS.

The actual spectrograms, however, are processed and stored in the system 118'. With the help of the clock generator 29, the nominal values are read off simultaneously with the input of the actual values, so that they can be compared to each other in a comparator 30. These differential data are preferably subjected to an integration procedure in an integration stage 31, whose output signal is supplied to a control stage 36 known per se. Alternatively, instead of reading the given nominal values off point by point along a curve, there is effected a chemometrical evaluation, particularly by means of a factor analysis, which represents an improvement in the evaluation.

What is claimed is:

1. A method for continuously crystallizing and polymerizing synthetic material including the steps of crystallizing amorphous material at least partially, preheating said material in a preheating zone with a preheating outlet area, exposing the preheated material to a main heat treatment within a reactor, said reactor having a reactor outlet area, cooling said material from said reactor within a cooler with a cooler outlet area, analyzing said synthetic material in at least one of said outlet areas with an optical analyzing means including the step of determining at least one actual process parameter, comparing at least one of said actual process parameters with at least one set value determined by at least one calibration procedure, and deducing by said comparing a control value for controlling at least one control means.

2. Method as claimed in claim 1, wherein said preheating is heating said material up to a temperature of 220° to 230° C.

3. Method as claimed in claim 1, wherein said analyzing takes place in said preheating outlet area.

4. Method as claimed in claim 1, wherein said analyzing takes place in said reactor outlet area.

5. Method as claimed in claim 1, wherein said analyzing takes place in said cooler outlet area.

6. Method as claimed in claim 1, wherein said determined actual process parameter is the degree of polymerization.

7. Method as claimed in claim 1, wherein said determined actual process parameter is a physical parameter.

8. Method as claimed in claim 1, wherein said determined actual process parameter is a chemical parameter.

9. Method as claimed in claim 1, wherein said analyzing includes a spectral analysis with a spectrometer for deducing an actual spectrogram representing an actual process parameter and said comparing is carried out in between said actual spectrogram and at least two set spectrograms which were measured during calibration for material with different values of said process parameters.

10. Method as claimed in claim 9, wherein said spectrometer is a polarization single beam interferometer.

11. Method as claimed in claim 9, wherein said actual process parameter is the degree of polymerization.

12. Method as claimed in claim 9, wherein at least one of said actual process parameters is a physical parameter.

13. Method as claimed in claim 9, wherein at least one of said actual process parameters is a chemical parameter.

14. Method as claimed in claim 9, wherein said spectrogram is calculated by means of a Fourier analysis.

15. Method as claimed in claim 9, wherein said Fourier analysis is a Fast Fourier analysis.

16. Method as claimed in claim 1, wherein said crystallizing is effected at a temperature of about 170° C.±10° C.

17. Method as claimed in claim 1, wherein said crystallizing is effected within at least one fluidized bed.

18. Method as claimed in claim 1, wherein said crystallizing is effected within two fluidized beds.

19. Method as claimed in claim 1, wherein said crystallizing is effected within a first and a second successive bed, said first bed is a spouted bed and said second bed is a fluidized bed with a bulk flowing through.

20. Method as claimed in claim 1, wherein at least one heat treatment is carried out in the presence of inert gas.

21. Method as claimed in claim 20, wherein said inert gas is nitrogen.

22. Method as claimed in claim 1, wherein said material is flowing through a cooler after said reactor.

23. Method as claimed in claim 1, wherein said at least one control means comprises at least one first control means for controlling the temperature of said material in said preheating zone.

24. Method as claimed in claim 1, wherein said at least one control means comprises at least one first control means for controlling the temperature of said material in said preheating zone.

25. Method as claimed in claim 1, wherein said at least one control means comprises at least one second control means for controlling a residence time of said material in said main heating zone.

26. Method as claimed in claim 1, wherein said at least one control means comprises at least one second control means for controlling a residence time of said material in said main heating zone.

27. Method as claimed in claim 1, with at least two control means cooperating as a multi control system.

28. Method as claimed in claim 27, wherein said multi control system is a cascade control.

29. Method as claimed in claim 27, wherein said controlling uses a temperature for a main controlling step and a residence time of said material in a treatment zone for an accessory controlling.

30. Method as claimed in claim 9, wherein said spectrograms are calculated for different wavelengths.

31. Method as claimed in claim 30, wherein said wavelengths are in the range of about 1000 nm to 2500 nm.

32. Method as claimed in claim 1, wherein said calibration procedure is applied to material with different temperatures.

33. Method as claimed in claim 32, further comprising the step of deriving a temperature-dependent correction factor from said calibration at different temperatures.

34. Method as claimed in claim 32, wherein said calibration procedure includes the measurement of the temperature of said material under calibration.

35. A system for continuously crystallizing and polymerizing synthetic material comprising:

crystallizing means for crystallizing said synthetic material, said crystallizing means including first heat treatment means for a first heat treatment;

feeding means for feeding said material to said crystallizing means;

reactor means for polymerizing said material upon said material leaving said crystallizing means, said reactor means including at least one second heat treatment means for a second heat treatment;

at least one control means, and at least one heater means for supplying each of said heat treatment means with heat energy controlled by said at least one control means;

a cooler for cooling said material after completion of a heating by said second heat treatment means;

at least one charge means for controlling a rate of feed of said material into said reactor means;

at least one discharge means for controlling a rate of feed of said material out of said reactor means;

an optical analyzing system for determining at least one actual process parameter, for comparing said actual parameter with at least one set value determined by at least one calibration procedure, and for outputting at least one control signal for controlling said at least one control means, said analyzing system comprising at least one optical sensing means with at least one sensor output;

at least one digital processing system connected to said at least one sensor output and comprising memory means for memorizing said at least one set value, comparator means for comparing said actual parameter with said at least one set value, said at least one digital processing system having at least one control output for supplying a control signal;

at least one controller for controlling at least one process control parameter, said at least one controller being connected to said at least one control output;

wherein said at least one heater means heats a preheating zone at an input end of said second heat treatment means.

36. System as claimed in claim 35, wherein at least one of said actual parameters is the degree of polymerization.

37. System as claimed in claim 35, wherein at least one of said actual parameters is a physical parameter.

38. System as claimed in claim 35, wherein at least one of said actual parameters is a chemical parameter.

39. System as claimed in claim 35, further comprising a switching element for connecting said optical sensing means alternatively to one of a first and a second digital processing systems wherein said first processing system is used for handling said at least one set value determined by at least one calibration procedure and said second processing system is used for handling said actual parameters.

40. System as claimed in claim 35, wherein said optical sensing means is a spectrometer.

41. System as claimed in claim 35, wherein said optical sensing means is a polarization single beam interferometer.

42. System as claimed in claim 35, wherein said digital processing system includes a module for making Fourier analysis for deriving spectrograms.

43. System as claimed in claim 35, wherein said at least one heater means is controlled by said at least one control means.

44. A system for continuously crystallizing and polymerizing synthetic material comprising:

crystallizing means for crystallizing said synthetic material, said crystallizing means including first heat treatment means for a first heat treatment;

feeding means for feeding said material to said crystallizing means;

reactor means for polymerizing said material upon said material leaving said crystallizing means, said reactor means including at least one second heat treatment means for a second heat treatment;

at least one control means, and at least one heater means for supplying each of said heat treatment means with heat energy controlled by said at least one control means;

a cooler for cooling said material after completion of a heating by said second heat treatment means;

at least one charge means for controlling a rate of feed of said material into said reactor means;

at least one discharge means for controlling a rate of feed of said material out of said reactor means;

an optical analyzing system for determining at least one actual process parameter, for comparing said actual parameter with at least one set value determined by at least one calibration procedure, and for outputting at least one control signal for controlling said at least one control means, said analyzing system comprising at least one optical sensing means with at least one sensor output;

at least one digital processing system connected to said at least one sensor output and comprising memory means for memorizing said at least one set value, comparator means for comparing said actual parameter with said at least one set value, said at least one digital processing system having at least one control output for supplying a control signal;

at least one controller for controlling at least one process control parameter, said at least one controller being connected to said at least one control output;

wherein said at least one heater means is controlled by said at least one control means; and said at least one heater means heats a preheating zone at an input end of said second heat treatment means.

45. A system for continuously crystallizing and polymerizing synthetic material comprising:

crystallizing means for crystallizing said synthetic material, said crystallizing means including first heat treatment means for a first heat treatment;

feeding means for feeding said material to said crystallizing means;

reactor means for polymerizing said material upon said material leaving said crystallizing means, said reactor means including at least one second heat treatment means for a second heat treatment;

at least one control means, and at least one heater means for supplying each of said heat treatment means with heat energy controlled by said at least one control means;

a cooler for cooling said material after completion of a heating by said second heat treatment means;

at least one charge means for controlling a rate of feed of said material into said reactor means;

at least one discharge means for controlling a rate of feed of said material out of said reactor means;

an optical analyzing system for determining at least one actual process parameter, for comparing said actual parameter with at least one set value determined by at least one calibration procedure, and for outputting at least one control signal for controlling said at least one control means, said analyzing system comprising at least one optical sensing means with at least one sensor output;

at least one digital processing system connected to said at least one sensor output and comprising memory means for memorizing said at least one set value, comparator means for comparing said actual parameter with said at least one set value, said at least one digital processing system having at least one control output for supplying a control signal;

at least one controller for controlling at least one process control parameter, said at least one controller being connected to said at least one control output;

wherein said at least one heater means is controlled by said at least one control means; and said at least one heater means heats a main heating zone in a central area of said second heat treatment means.

46. System as claimed in claim 35, wherein said at least one charge means is controlled by said at least one control means.

47. System as claimed in claim 35, wherein said at least one discharge means is controlled by said at least one control means.

48. System as claimed in claim 35, further comprising an amplifier means connected to said sensor output, and an analog digital converter connected to said amplifier.

49. System as claimed in claim 35, wherein said crystallizing means further comprises at least one fluidized bed.

50. System as claimed in claim 35, wherein said crystallizing means further comprises two fluidized beds.

51. System as claimed in claim 35, wherein said crystallizing means further comprises a first and a second successive bed, said first bed being a spouted bed and said second bed being a fluidized bed with a bulk flowing through.

52. System as claimed in claim 35, further comprising a preheating zone located at an input end of said reactor, said preheating zone being a second heat treatment means.

53. System as claimed in claim 52, wherein said first heat treatment means and said second heat treatment means are connected to corresponding first and second heater means producing a first lower and a second higher temperature.

54. System as claimed in claim 53, wherein said first temperature is in the range from 150° C. to 180° C. and the second temperature is in the range from 180° C. to 250° C.

55. A system for continuously crystallizing and polymerizing synthetic material comprising:

crystallizing means for crystallizing said synthetic material, said crystallizing means including first heat treatment means for a first heat treatment;

feeding means for feeding said material to said crystallizing means;

reactor means for polymerizing said material upon said material leaving said crystallizing means, said reactor means including at least one second heat treatment means for a second heat treatment;

at least one control means, and at least one heater means for supplying each of said heat treatment means with heat energy controlled by said at least one control means;

a cooler for cooling said material after completion of a heating by said second heat treatment means;

at least one charge means for controlling a rate of feed of said material into said reactor means;

at least one discharge means for controlling a rate of feed of said material out of said reactor means;

an optical analyzing system for determining at least one actual process parameter, for comparing said actual parameter with at least one set value determined by at least one calibration procedure, and for outputting at least one control signal for controlling said at least one control means, said analyzing system comprising at least one optical sensing means with at least one sensor output;

at least one digital processing system connected to said at least one sensor output and comprising memory means for memorizing said at least one set value, comparator means for comparing said actual parameter with said at least one set value, said at least one digital processing system having at least one control output for supplying a control signal;

at least one controller for controlling at least one process control parameter, said at least one controller being connected to said at least one control output;

wherein said at least one optical sensing means is disposed at at least one of a plurality of observation points including an input end and a central area of said second heat treatment means.

* * * * *